(12) United States Patent
Wang

(10) Patent No.: US 11,613,046 B2
(45) Date of Patent: Mar. 28, 2023

(54) MESHING-TYPE RUBBER INTERNAL MIXER AND WORKING METHOD THEREOF

(71) Applicant: Anhui Lixin Rubber Technology Co., Ltd., Xuancheng (CN)

(72) Inventor: Bikuan Wang, Xuancheng (CN)

(73) Assignee: Anhui Lixin Rubber Technology Co., Ltd., Xuancheng (CN)

( * ) Notice: Subject to any disclaimer, the term of this patent is extended or adjusted under 35 U.S.C. 154(b) by 161 days.

(21) Appl. No.: 17/151,576

(22) Filed: Jan. 18, 2021

(65) Prior Publication Data
US 2021/0402648 A1 Dec. 30, 2021

(30) Foreign Application Priority Data
Jun. 28, 2020 (CN) .......................... 202010599187.7

(51) Int. Cl.
*B29B 7/20* (2006.01)
*B01F 35/43* (2022.01)
(Continued)

(52) U.S. Cl.
CPC .............. *B29B 7/20* (2013.01); *B01F 27/707* (2022.01); *B01F 35/1453* (2022.01); *B01F 35/3204* (2022.01); *B01F 35/43* (2022.01); *B01F 35/7174* (2022.01); *B01F 35/754* (2022.01); *B08B 3/08* (2013.01); *B29B 7/24* (2013.01);
(Continued)

(58) Field of Classification Search
CPC .... B29B 7/20; B29B 7/24; B29B 7/26; B29B 7/28; B29B 7/826; B29B 7/183; B29B 7/186; B29B 7/7495; B29B 7/22; B01F 27/707; B01F 35/1453; B01F 35/3204; B01F 35/43; B01F 35/7174; B01F 35/754;
(Continued)

(56) References Cited

U.S. PATENT DOCUMENTS 5,061,078 A * 10/1991 Yada .................... B29B 7/183
366/97
9,643,338 B2 * 5/2017 Edwards ................ B29B 7/823
(Continued)

FOREIGN PATENT DOCUMENTS

CN 101214706 A 7/2008
DE 102017212387 A1 * 1/2019 ............. B29B 7/183

*Primary Examiner* — Charles Cooley
(74) *Attorney, Agent, or Firm* — Brian S. Boyer; Syndicated Law, PC

(57) ABSTRACT

A meshing-type rubber internal mixer and a working method thereof are provided. The meshing rubber internal mixer includes a frame mechanism, a mixing mechanism, and an unloading mechanism. The mixing mechanism is on the upper side of the unloading mechanism. The mixing mechanism and the unloading mechanism are in the frame mechanism. An internal mixing chamber is of a closed structure through first automatic telescopic plates and second automatic telescopic plates. The gap between a first meshing-type rotor and a second meshing-type rotor is small, a material is compressed to enter the space between the first meshing-type rotor and the second meshing-type rotor to be extruded with an internal mixing chamber wall. The material is flaky in the internal mixing chamber, so that the material produces great strain deformation, thereby achieving excellent dispersing and mixing effects.

7 Claims, 4 Drawing Sheets

(51) Int. Cl.
*B01F 35/71* (2022.01)
*B01F 27/707* (2022.01)
*B01F 35/10* (2022.01)
*B01F 35/75* (2022.01)
*B01F 35/32* (2022.01)
*B08B 3/08* (2006.01)
*B29B 7/24* (2006.01)
*B29B 7/26* (2006.01)
*B29B 7/28* (2006.01)
*B29B 7/82* (2006.01)
*B01F 101/00* (2022.01)
*B01F 35/33* (2022.01)

(52) U.S. Cl.
CPC ................. *B29B 7/26* (2013.01); *B29B 7/28* (2013.01); *B29B 7/826* (2013.01); *B01F 35/33* (2022.01); *B01F 2101/2805* (2022.01)

(58) Field of Classification Search
CPC .... B01F 35/33; B01F 2101/2805; B08B 3/08; B08B 3/02
USPC ............................................... 366/76.7, 76.8
See application file for complete search history.

(56) References Cited

U.S. PATENT DOCUMENTS

| | | | | |
|---|---|---|---|---|
| 2014/0016428 | A1* | 1/2014 | Akai | B29B 7/286 366/76.2 |
| 2014/0291876 | A1* | 10/2014 | Yada | B29B 17/0005 264/37.29 |
| 2021/0402648 | A1* | 12/2021 | Wang | B29B 7/24 |
| 2022/0347887 | A1* | 11/2022 | Koitabashi | B29B 7/183 |

* cited by examiner

MESHING-TYPE RUBBER INTERNAL MIXER AND WORKING METHOD THEREOF

CROSS REFERENCE TO RELATED APPLICATION

This application claims the priority benefit of Chinese Patent Application No. 202010599187.7, filed Jun. 28, 2020, which is hereby incorporated herein by reference in its entirety.

TECHNICAL FIELD

The present disclosure belongs to the technical field of internal mixing, and particularly discloses a meshing-type rubber internal mixer.

BACKGROUND

An internal mixer is one of the most important rubber mixing equipment in modern rubber industry. Since the emergence of the Banbury mixer in 1916 in the true sense, due to a series of characteristics thereof superior to those of an open mill shown in the rubber mixing process, for example, the mixing is large in capacity, short in time, and high in production efficiency, dust flying is overcome better, the loss of ingredients is reduced, the product quality and working environment are improved, the operation is safe and convenient, the labor intensity is reduced, and mechanical and automated operations are beneficially realized, the Banbury mixer has become an important achievement in the field of rubber mixing, is still typical important equipment in plasticizing and mixing so far, and is constantly developing and improving.

The present disclosure with the patent number of CN101214706A relates to a double-station series combined internal mixer, and belongs to the field of rubber processing machinery. The technical solution adopted to solve the technical problems of the present disclosure is that: two parts, namely, an upper station and a lower station, are involved. The upper station is a complete internal mixer. The lower station is an internal mixer with a ram piston removed. A discharging port of the upper station is connected to a feeding port of the lower station through a connecting section material cylinder. The upper station adopts a common low temperature rotor, and the lower station should adopt a fast feeding type low temperature rotor. Two internal mixers are fully combined two in one, which gives full play to the processing capacity of the internal mixers, and greatly improves the processing efficiency of temperature sensitive compounds, such as silica gel. The lower station does not have the ram, and a filling coefficient is small, so the steam exhaust performance is very good, and the problem about steam exhaust of a single-station internal mixer is solved. The problems of low efficiency and steam exhaust are solved, meanwhile, the stability of a compound is also improved, and the number of workers and the energy consumption are also reduced.

SUMMARY

To solve the technical problems, the present disclosure provides a meshing-type rubber internal mixer.

The technical problems to be solved by the present disclosure are that: the traditional open mill is one of the equipment with the highest incidence of industrial accidents in a rubber mixing process, and its working environment is the reason of the increase of a risk factor. Rotor edges of non-meshing-type rotors are not meshed with each other in an internal mixer, so there is not internal mixing at the center of the internal mixer.

The objective of the present disclosure may be achieved by the following technical solutions:

A meshing-type rubber internal mixer includes a frame mechanism, a mixing mechanism, and an unloading mechanism. The mixing mechanism is on the upper side of the unloading mechanism. The mixing mechanism and the unloading mechanism are in the frame mechanism.

The frame mechanism includes a feeding port, an internal mixing chamber wall, a water inlet, a waste liquid port, a water outlet, first automatic telescopic plates, a detergent nozzle, a pressure reducing valve, a pressing plate, a first telescopic rod, a blow dryer, an air cylinder, a booster pump, an air inlet pipe, an internal mixing chamber, a fixed frame, and a bearing bottom plate. The upper surface of the bearing bottom plate is fixed to the bottom end of the internal mixing chamber wall. The internal mixing chamber wall is of a jacket structure. The pressure reducing valve is fixedly mounted on the other side of the top end of the internal mixing chamber wall. The feeding port is fixedly mounted between the detergent nozzle and the pressure reducing valve. The feeding port, the pressure reducing valve, and the detergent nozzle all penetrate through the top end of the internal mixing chamber wall. A top cover is mounted on one side of the top end of the feeding port in a hinged manner. The blow dryer is fixedly mounted on the top cover. The air cylinder is fixedly mounted on the other side of the top end of the feeding port. The first telescopic rod is fixedly mounted at the bottom end of the air cylinder. The pressing plate is fixedly mounted at the bottom end of the first telescopic rod. The fixed frame is rigidly connected to the outer surface of the internal mixing chamber wall and is located above the water outlet. The air inlet pipe penetrates through the internal mixing chamber wall and is located above the fixed frame. The tail end of the air inlet pipe is connected to the booster pump. The internal mixing chamber is located inside the internal mixing chamber wall. The internal mixing chamber is connected to a power supply and a heating power supply. The upper surface of each first automatic telescopic plate is not in contact with the lower end of the feeding port and the lower end of the pressure reducing valve. The lower surface of each first automatic telescopic plate is not in contact with the air inlet pipe.

The mixing mechanism includes a motor, a driving wheel, a driven wheel, a first meshing-type rotor, a second meshing-type rotor, and second telescopic rods. The motor is placed in the fixed frame. One end of the driving wheel is connected to the motor, and the other end of the driving wheel is connected to the first meshing-type rotor. The driving wheel is in meshing connection with the driven wheel, and the transmission ratio is 1:1. The driven wheel is connected to the second meshing-type rotor. The first meshing-type rotor and the second meshing-type rotor are mounted in parallel. The meshing gap between the first meshing-type rotor and the second meshing-type rotor is 1 mm. One end of each of the two telescopic rods is fixedly mounted in the internal mixing chamber wall.

The unloading mechanism includes a rotary oil cylinder, a bearing, a transmission shaft, second automatic telescopic plates, a concave tank, and an unloading door. The concave tank is placed at the bottom end in the internal mixing chamber wall. The concave tank is not in contact with the bottom end in the internal mixing chamber wall, and the concave tank is mounted at the bottom end in the internal mixing chamber wall through the transmission shaft. The bearing is mounted at the connection between the transmission shaft and the internal mixing chamber wall. The second automatic telescopic plates are above the concave tank and are not in contact with the concave tank. The internal mixing chamber is of a closed structure through the first automatic telescopic plates and the second automatic telescopic plates. The rotary oil cylinder is fixed to the upper surface of the bearing bottom plate outside the internal mixing chamber wall. One end of the transmission shaft is connected to the rotary oil cylinder. One side of the unloading door is hinged to the bottom end of the internal mixing chamber wall.

Further, the water inlet is fixedly mounted in the center of one side of the internal mixing chamber wall. The water outlet is fixedly mounted in the lower end of the other side of the internal mixing chamber wall. The detergent nozzle is fixedly mounted on one side of the top end of the internal mixing chamber wall.

Further, one end of each first automatic telescopic plate is fixedly mounted in the internal mixing chamber wall, and the two first automatic telescopic plates may be lengthened or shortened from the two ends to the middle.

Further, one end of each of the two second telescopic rods is fixedly mounted in the internal mixing chamber wall.

Further, one end of each of the two second automatic telescopic plates is fixedly mounted at the bottom end in the internal mixing chamber wall, and the two second automatic telescopic plates may be lengthened or shortened from the two ends to the middle.

Further, the unloading door may rotate around the hinged side, and the unloading door may be kept in a closed state through magnetic adsorption.

Further, a working method of the meshing-type rubber internal mixer includes the following steps:

opening the top cover on one side of the upper end of the feeding port; feeding a material into the feeding port; pushing the first telescopic rod to move downward by the air cylinder mounted above the feeding port; pushing the pressing plate downward by the first telescopic rod, at this time, the first automatic telescopic plates being in an open state; pushing the material to enter the internal mixing chamber; mounting the blow dryer above the feeding port; performing pulse blowing by the blow dryer by using compressed air to blow down the powder filler that accumulates or remains on the feeding port and the pressing plate into the internal mixing chamber; meanwhile, connecting the internal mixing chamber to a power supply and a heating power supply to preheat the internal mixing chamber;

closing the first automatic telescopic plates after the material enters the internal mixing chamber; connecting the motor to drive the driving wheel and the driven wheel to run, so that the first meshing-type rotor and the second meshing-type rotor are driven to rotate oppositely, and because the first meshing-type rotor and the second meshing-type rotor have a large velocity gradient at a meshing position, strong friction, shearing, and kneading effects are achieved on the material between the rotors; controlling the booster pump and the air inlet pipe to compress the air in the internal mixing chamber, and performing pressurized mixing on the material for 4 minutes; opening the pressure reducing valve; adding auxiliary materials at the feeding port; repeating the feeding operation above; adding the auxiliary materials into the mixed material and performing internal mixing again;

after the internal mixing is completed, opening the first automatic telescopic plates, the pressure reducing valve, the second automatic telescopic plates, and the second telescopic rods in sequence; under the action of the second telescopic rods, discharging the mixed rubber into the concave tank below the second automatic telescopic plates; opening the seconnd automatic telescopic plates to discharge the mixed rubber from the internal mixing chamber into the concave tank; driving the transmission shaft and the concave to rotate by using the rotary oil cylinder; opening the unloading door to discharge the mixed rubber out from the concave tank;

after the internal mixing is completed, introducing cooling water into the water inlet, where the cooling water enters the interlayer of the internal mixing chamber wall from the water inlet and flows out from the water outlet to cool the internal mixing chamber; adding a detergent into the detergent nozzle for cleaning the internal mixing chamber, where a waste liquid may be drained from the waste liquid port.

The present disclosure has the beneficial effects:

The internal mixing chamber is of a closed structure through the first automatic telescopic plates and the second automatic telescopic plates, so that an upper end feeding part, a middle mixing part, and a bottom end unloading part are divided into relatively independent space, which overcomes dust flying and reduces the loss of ingredients better.

The gap between the first meshing-type rotor and the second meshing-type rotor is small, so a material is compressed to enter the space between the first meshing-type rotor and the second meshing-type rotor to be extruded with an internal mixing chamber wall. The material is flaky in the internal mixing chamber, so that the material produces great strain deformation, thereby achieving excellent dispersing and mixing effects. Meanwhile, during a mixing process, the contact area between the material and equipment is large, which improves the heat transfer efficiency of the equipment.

After the internal mixing is ended, the mixed rubber may completely fall into the concave tank under the action of the second telescopic rods and the gravity. The unloading door is rotatably connected to external equipment, so that the mixed rubber is transferred better.

After the unloading is ended, the rubber mixer may be cooled by introducing cooling water into the interlayer of the internal mixing chamber wall. After cooling, a detergent is added at the detergent nozzle for cleaning the internal mixing chamber, so that the corrosion of the detergent to a machine at a high temperature is reduced by cleaning after cooling.

BRIEF DESCRIPTION OF THE DRAWINGS

To facilitate the understanding of those skilled in the art, the present disclosure will be further described below with reference to the accompanying drawings.

Figure 1:
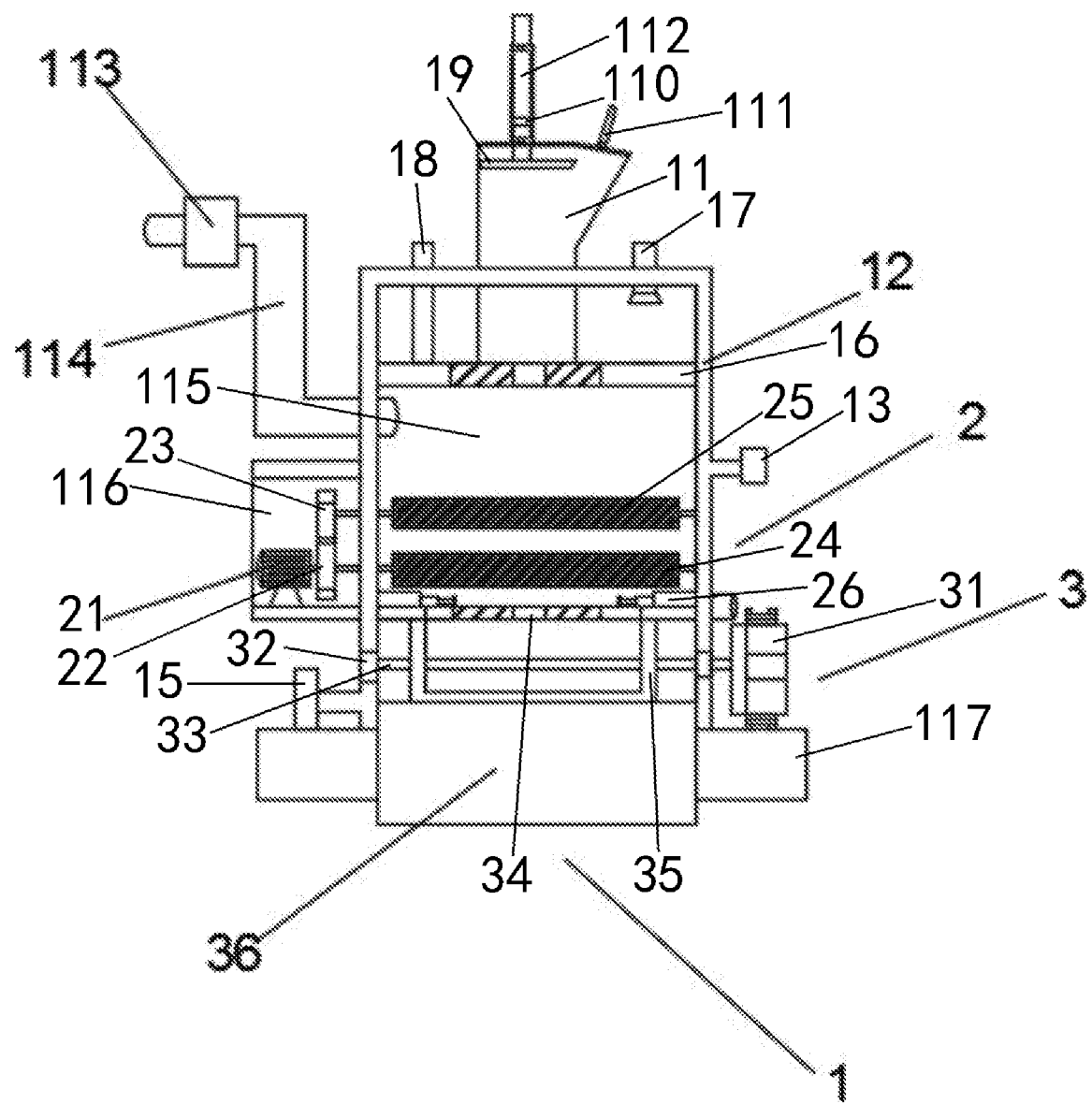
FIG. 1 is a schematic structural diagram of a meshing-type rubber internal mixer of the present disclosure.

In the drawings: 1—frame mechanism; 11—feeding port; 12—internal mixing chamber; 13—water inlet; 14—waste liquid port; 15—water outlet; 16—first automatic telescopic plate; 17—detergent nozzle, 18—pressure reducing valve; 19—pressing plate; 110—first telescopic rod; 111—blow dryer; 112—air cylinder; 113—booster pump; 114—air inlet pipe; 115—internal mixing chamber; 116—fixed frame; 117—bearing bottom plate; 2—mixing mechanism; 21—motor; 22—driving wheel; 23—driven wheel; 24—first meshing-type rotor; 25—second meshing-type rotor; 26—second telescopic rod; 3—unloading mechanism; 31—rotary oil cylinder; 32—bearing; 33—transmission shaft; 34—second automatic telescopic plate; 35—concave tank; 36—unloading door.

DETAILED DESCRIPTION

The technical solutions in the embodiments of the present disclosure will be clearly and completely described hereinbelow with reference to the accompanying drawings in the embodiments of the present disclosure. Apparently, the described embodiments are merely part rather than all of the embodiments of the present disclosure. All other embodiments obtained by those of ordinary skill in the art based on the embodiments of the present disclosure without creative efforts shall fall within the protection scope of the present disclosure.

Referring to FIG. 1 to FIG. 5, a meshing-type rubber internal mixer, as shown in FIG. 1, includes a frame mechanism 1, a mixing mechanism 2, and an unloading mechanism 3. The mixing mechanism 2 is on the upper side of the unloading mechanism 3. The mixing mechanism 2 and the unloading mechanism 3 are in the frame mechanism 1.

Figure 2:
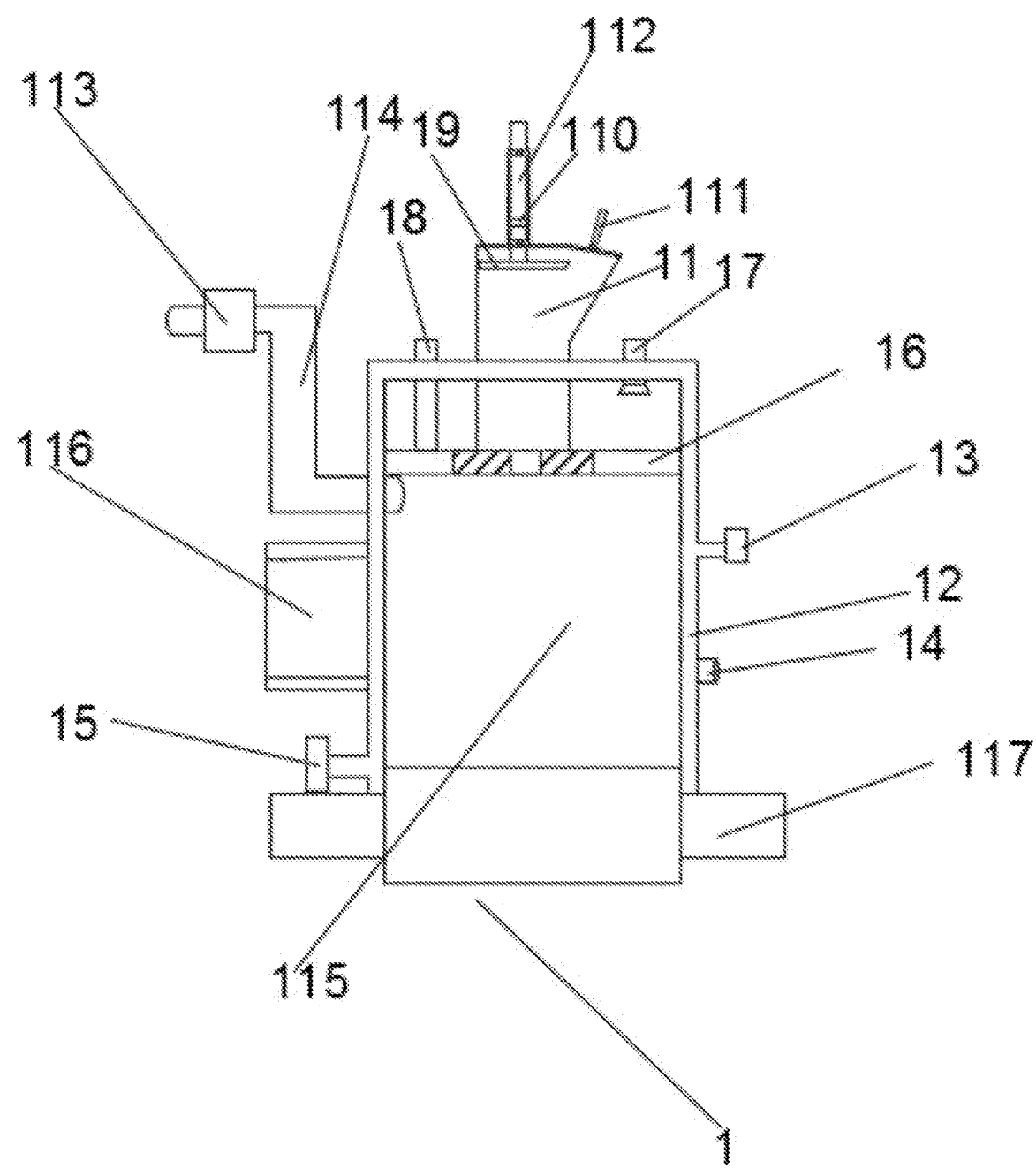
FIG. 2 is a schematic structural diagram of a frame mechanism of the meshing-type rubber internal mixer of the present disclosure.

As shown in FIG. 2, the frame mechanism 1 includes a feeding port 11, an internal mixing chamber wall 12, a water inlet 13, a waste liquid port 14, a water outlet 15, first automatic telescopic plates 16, a detergent nozzle 17, a pressure reducing valve 18, a pressing plate 19, a first telescopic rod 110, a blow dryer 111, an air cylinder 112, a booster pump 113, an air inlet pipe 114, an internal mixing chamber 115, a fixed frame 116, and a bearing bottom plate 117. The upper surface of the bearing bottom plate 117 is fixed to the bottom end of the internal mixing chamber wall 12. The internal mixing chamber wall 12 is of a jacket structure. The water inlet 13 is fixedly mounted at the center of one side of the internal mixing chamber wall 12. The water outlet 15 is fixedly mounted at the lower end of the other side of the internal mixing chamber wall 12. The detergent nozzle 17 is fixedly mounted on one side of the top end of the internal mixing chamber wall 12. The pressure reducing valve 18 is fixedly mounted on the other side of the top end of the internal mixing chamber wall 12. The feeding port 11 is fixedly mounted between the detergent nozzle 17 and the pressure reducing valve 18. The feeding port 11, the pressure reducing valve 18, and the detergent nozzle 17 all penetrate through the top end of the internal mixing chamber wall 12. A top cover is mounted on one side of the top end of the feeding port 11 in a hinged manner. The blow dryer 111 is fixedly mounted on the top cover. The air cylinder 112 is fixedly mounted on the other side of the top end of the feeding port 11. The first telescopic rod 110 is fixedly mounted at the bottom end of the air cylinder 112. The pressing plate 19 is fixedly mounted at the bottom end of the first telescopic rod 110. The fixed frame 116 is rigidly connected to the outer surface of the internal mixing chamber wall 12 and is located above the water outlet 15. The air inlet pipe 114 penetrates through the internal mixing chamber wall 12 and is located above the fixed frame 116. The tail end of the air inlet pipe 114 is connected to the booster pump 113. The internal mixing chamber 115 is located inside the internal mixing chamber wall 12. The internal mixing chamber 115 is connected to a power supply and a heating power supply. One end of each first automatic telescopic plate 16 is fixedly mounted in the internal mixing chamber wall 12. The two first automatic telescopic plates 16 may be lengthened or shortened from the two ends to the middle. The upper surface of each first automatic telescopic plate 16 is not in contact with the lower end of the feeding port 11 and the lower end of the pressure reducing valve 18. The lower surface of each first automatic telescopic plate 16 is not in contact with the air inlet pipe 114.

Figure 3:
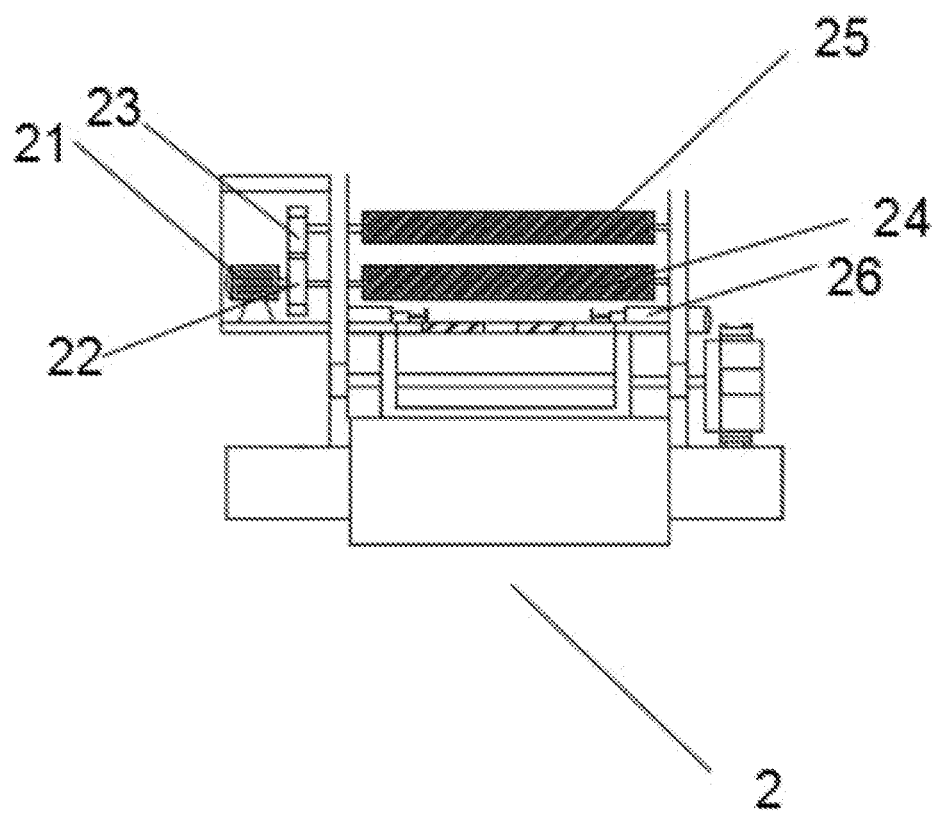
FIG. 3 is a schematic structural diagram of a mixing mechanism of the meshing-type rubber internal mixer of the present disclosure.
Figure 5:
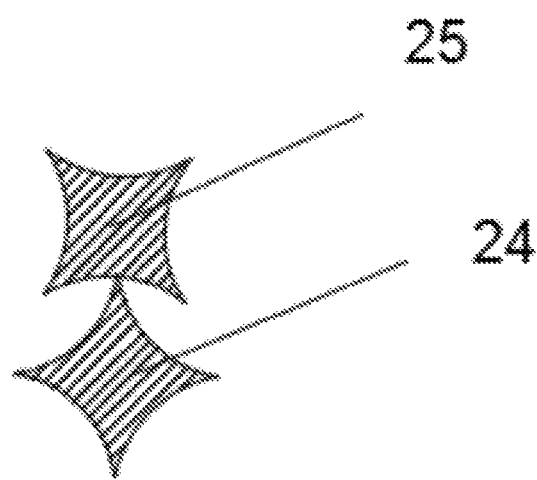
FIG. 5 is an enlarged schematic structural diagram of a side surface of a meshing-type rotor of the meshing-type rubber internal mixer of the present disclosure.

As shown in FIG. 2, FIG. 3, and FIG. 5, the mixing mechanism 2 includes a motor 21, a driving wheel 22, a driven wheel 23, a first meshing-type rotor 24, a second meshing-type rotor 25, and second telescopic rods 26. The motor 21 is placed in the fixed frame 116. One end of the driving wheel 22 is connected to the motor 21, and the other end of the driving wheel 22 is connected to the first meshing-type rotor 24. The driving wheel 22 is in meshing connection with the driven wheel 23, and the transmission ratio is 1:1. The driven wheel 23 is connected to the second meshing-type rotor 25. The first meshing-type rotor 24 and the second meshing-type rotor 25 are mounted in parallel. The meshing gap between the first meshing-type rotor 24 and the second meshing-type rotor 25 is 1 mm. One end of each of the two second telescopic rods 26 is fixedly mounted in the internal mixing chamber wall 12.

Figure 4:
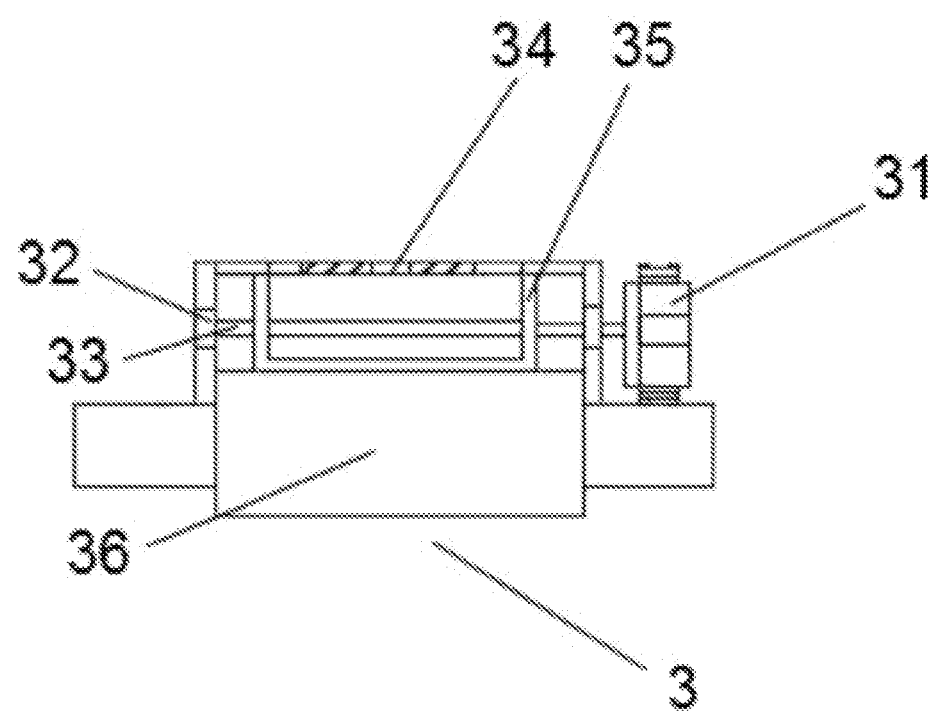
FIG. 4 is a schematic structural diagram of an unloading mechanism of the meshing-type rubber internal mixer of the present disclosure.

As shown in FIG. 2 and FIG. 4, the unloading mechanism 3 includes a rotary oil cylinder 31, a bearing 32, a transmission shaft 33, second automatic telescopic plates 34, a concave tank 35, and an unloading door 36. The concave tank 35 is placed at the bottom end in the internal mixing chamber wall 12. The concave tank 35 is not in contact with the bottom end in the internal mixing chamber wall 12, and the concave tank 35 is mounted at the bottom end in the internal mixing chamber wall 12 through the transmission shaft 33. The bearing 32 is mounted at the connection between the transmission shaft 33 and the internal mixing chamber wall 12. One end of each of the two second automatic telescopic plates 34 is fixedly mounted at the bottom end in the internal mixing chamber wall 12. The two second automatic telescopic plates 34 may be lengthened or shortened from the two ends to the middle. The second automatic telescopic plates 34 are above the concave tank 35 and are not in contact with the concave tank 35. The internal mixing chamber 115 is of a closed structure through the first automatic telescopic plates 16 and the second automatic telescopic plates 34. The rotary oil cylinder 31 is fixed to the upper surface of the bearing bottom plate 117 outside the internal mixing chamber wall 12. One end of the transmission shaft 33 is connected to the rotary oil cylinder 31. One side of the unloading door 36 is hinged to the bottom end of the internal mixing chamber wall 12. The unloading door 36 may rotate around the hinged side. The unloading door 36 may be kept in a closed state through magnetic adsorption.

The working principle and manner of the present disclosure are as follows:

opening the top cover on one side of the upper end of the feeding port 11; feeding a material into the feeding port 11; pushing the first telescopic rod 110 to move downward by the air cylinder 112 mounted above the feeding port 11; pushing the pressing plate 19 downward by the first telescopic rod 110, at this time, the first automatic telescopic plates 16 being in an open state; pushing the material to enter the internal mixing chamber 115; mounting the blow dryer 111 above the feeding port 11; performing pulse blowing by the blow dryer 111 by using compressed air to blow down the powder filler that accumulates or remains on the feeding port 11 and the pressing plate 19 into the internal mixing chamber 115; connecting the internal mixing chamber 115 to a power supply and a heating power supply to preheat the internal mixing chamber 115;

closing the first automatic telescopic plates 16 after the material enters the internal mixing chamber 115; connecting the motor 21 to drive the driving wheel 22 and the driven wheel 23 to run, so that the first meshing-type rotor 24 and the second meshing-type rotor 25 are driven to rotate oppositely, and because the first meshing-type rotor 24 and the second meshing-type rotor 25 have a large velocity gradient at a meshing position, strong friction, shearing, and kneading effects are achieved on the material between the rotors; controlling the booster pump 113 and the air inlet pipe 114 to compress the air in the internal mixing chamber 115, and performing pressurized mixing on the material for 4 minutes; opening the pressure reducing valve 18; adding auxiliary materials at the feeding port 11; repeating the feeding operation above; adding the auxiliary materials into the mixed material and performing internal mixing again;

after the internal mixing is completed, opening the first automatic telescopic plates 16, the pressure reducing valve 18, the second automatic telescopic plates 34, and the second telescopic rods 26 in sequence; under the action of the second telescopic rods 26, discharging the mixed rubber into the concave tank 35 below the second automatic telescopic plates 34; opening the first automatic telescopic plates 16 to discharge the mixed rubber from the internal mixing chamber 115 into the concave tank 35; driving the transmission shaft 33 and the concave tank 35 to rotate by using the rotary oil cylinder 31; opening the unloading door 36 to discharge the mixed rubber out from the concave tank 35;

after the internal mixing is completed, introducing cooling water into the water inlet 13, where the cooling water enters the interlayer of the internal mixing chamber wall 12 from the water inlet 13 and flows out from the water outlet 15 to cool the internal mixing chamber 115; adding a detergent into the detergent nozzle 17 for cleaning the internal mixing chamber 115, where a waste liquid may be drained from the waste liquid port 14.

The above contents are merely examples and explanations of the present disclosure. Various modifications or supplements or substitution in similar ways to the described specific embodiments made by those skilled in the art shall belong to the protection scope of the present disclosure as long as not deviating from the scope of the present disclosure or exceeding the scope defined in the claims.

I claim:

1. A meshing-type rubber internal mixer, comprising a frame mechanism (1), a mixing mechanism (2), and an unloading mechanism (3), wherein the mixing mechanism (2) is on the upper side of the unloading mechanism (3); the mixing mechanism (2) and the unloading mechanism (3) are in the frame mechanism (1); the frame mechanism (1) comprises a feeding port (11), an internal mixing chamber wall (12), a water inlet (13), a waste liquid port (14), a water outlet (15), first automatic telescopic plates (16), a detergent nozzle (17), a pressure reducing valve (18), a pressing plate (19), a first telescopic rod (110), a blow dryer (111), an air cylinder (112), a booster pump (113), an air inlet pipe (114), an internal mixing chamber (115), a fixed frame (116), and a bearing bottom plate (117); the upper surface of the bearing bottom plate (117) is fixed to the bottom end of the internal mixing chamber wall (12); the internal mixing chamber wall (12) is of a jacket structure; the pressure reducing valve (18) is fixedly mounted on the other side of the top end of the internal mixing chamber wall (12); the feeding port (11) is fixedly mounted between the detergent nozzle (17) and the pressure reducing valve (18); the feeding port (11), the pressure reducing valve (18), and the detergent nozzle (17) all penetrate through the top end of the internal mixing chamber wall (12);

a top cover is mounted on one side of the top end of the feeding port (11) in a hinged manner; the blow dryer (111) is fixedly mounted on the top cover; the air cylinder (112) is fixedly mounted on the other side of the top end of the feeding port (11); the first telescopic rod (110) is fixedly mounted at the bottom end of the air cylinder (112); the pressing plate (19) is fixedly mounted at the bottom end of the first telescopic rod (110);

the fixed frame (116) is rigidly connected to the outer surface of the internal mixing chamber wall (12) and is located above the water outlet (15); the air inlet pipe (114) penetrates through the internal mixing chamber wall (12) and is located above the fixed frame (116); the tail end of the air inlet pipe (114) is connected to the booster pump (113); the internal mixing chamber (115) is located inside the internal mixing chamber wall (12); the internal mixing chamber (115) is connected to a power supply and a heating power supply;

the upper surface of each first automatic telescopic plate (16) is not in contact with the lower end of the feeding port (11) and the lower end of the pressure reducing valve (18); the lower surface of each first automatic telescopic plate (16) is not in contact with the air inlet pipe (114);

the mixing mechanism (2) comprises a motor (21), a driving wheel (22), a driven wheel (23), a first meshing-type rotor (24), a second meshing-type rotor (25), and two second telescopic rods (26); the motor (21) is placed in the fixed frame (116); one end of the driving wheel (22) is connected to the motor, and the other end of the driving wheel (22) is connected to the first meshing-type rotor (24); the driving wheel (22) is in meshing connection with the driven wheel (23), and a transmission ratio between the driving wheel and the driven wheel is 1:1; the driven wheel (23) is connected to the second meshing-type rotor (25); the first meshing-type rotor (24) and the second meshing-type rotor (25) are mounted in parallel; the meshing gap between the first meshing-type rotor (24) and the second meshing-type rotor (25) is 1 mm;

the unloading mechanism (3) comprises a rotary oil cylinder (31), a bearing (32), a transmission shaft (33), second automatic telescopic plates (34), a concave tank (35), and an unloading door (36); the concave tank (35) is placed at the bottom end in the internal mixing chamber wall (12); the concave tank (35) is not in contact with the bottom end in the internal mixing chamber wall (12), and the concave tank (35) is mounted at the bottom end in the internal mixing chamber wall (12) through the transmission shaft (33); the bearing (32) is mounted at the connection between the transmission shaft (33) and the internal mixing chamber wall (12); the second automatic telescopic plates (34) are above the concave tank (35) and are not in contact with the concave tank (35);

the internal mixing chamber (115) is of a closed structure through the first automatic telescopic plates (16) and the second automatic telescopic plates (34);

the rotary oil cylinder (31) is fixed to the upper surface of the bearing bottom plate (117) outside the internal mixing chamber wall (12); one end of the transmission shaft (33) is connected to the rotary oil cylinder (31); one side of the unloading door (36) is hinged to the bottom end of the internal mixing chamber wall (12).

2. The meshing-type rubber internal mixer according to claim 1, wherein the water inlet (13) is fixedly mounted at the center of one side of the internal mixing chamber wall (12); the water outlet (15) is fixedly mounted at the lower end of the other side of the internal mixing chamber wall (12); the detergent nozzle (17) is fixedly mounted on one side of the top end of the internal mixing chamber wall (12).

3. The meshing-type rubber internal mixer according to claim 1, wherein the first automatic telescopic plates (16) include two first automatic telescopic plates (16) with two ends and a middle, one end of each first automatic telescopic plate (16) is fixedly mounted in the internal mixing chamber wall (12); and, each of the two first automatic telescopic plates (16) is configured to be lengthened or shortened from the two ends to the middle of the first automatic telescopic plates (16).

4. The meshing-type rubber internal mixer according to claim 1, wherein one end of each of the two second telescopic rods (26) is fixedly mounted in the internal mixing chamber wall (12).

5. The meshing-type rubber internal mixer according to claim 1, wherein the second automatic telescopic plates (34) include two second automatic telescopic plates (34) with two ends and a middle, one end of each of the two second automatic telescopic plates (34) is fixedly mounted at the bottom end in the internal mixing chamber wall (12); and, each of the two second automatic telescopic plates (34) is configured to be lengthened or shortened from the two ends to the middle of the second automatic telescopic plates (34).

6. The meshing-type rubber internal mixer according to claim 1, wherein the unloading door (36) is configured to rotate around the hinged side and be kept in a closed state magnetically.

7. A working method of the meshing-type rubber internal mixer according to claim 1, comprising the following steps:

opening the top cover on one side of the upper end of the feeding port (11); feeding a material into the feeding port (11); pushing the first telescopic rod (110) to move downward by the air cylinder (112) mounted above the feeding port (11); pushing the pressing plate (19) downward by the first telescopic rod (110), at this time, the first automatic telescopic plates (16) being in an open state; pushing the material to enter the internal mixing chamber (115); mounting the blow dryer (111) above the feeding port (11); performing pulse blowing by the blow dryer (111) by using compressed air to blow down the powder filler that accumulates or remains on the feeding port (11) and the pressing plate (19) into the internal mixing chamber (115); meanwhile, connecting the internal mixing chamber (115) to a power supply and a heating power supply to preheat the internal mixing chamber (115);

closing the first automatic telescopic plates (16) after the material enters the internal mixing chamber (115); connecting the motor (21) to drive the driving wheel (22) and the driven wheel (23) to run, so that the first meshing-type rotor (24) and the second meshing-type rotor (25) are driven to rotate oppositely, and because the first meshing-type rotor (24) and the second meshing-type rotor (25) have a large velocity gradient at a meshing position, strong friction, shearing, and kneading effects are achieved on the material between the rotors; controlling the booster pump (113) and the air inlet pipe (114) to compress the air in the internal mixing chamber (115), and performing pressurized mixing on the material for 4 minutes; opening the pressure reducing valve (18); adding auxiliary materials into the feeding port (11); repeating the feeding operation above; adding the auxiliary materials into the mixed material and performing internal mixing again;

after the internal mixing is completed, opening the first automatic telescopic plates (16), the pressure reducing valve (18), the second automatic telescopic plates (34), and the second telescopic rods (26) in sequence; under the action of the second telescopic rods (26), discharging the mixed rubber into the concave tank (35) below the second automatic telescopic plates (34); opening the second automatic telescopic plates (34) to discharge the mixed rubber from the internal mixing chamber (115) into the concave tank (35); driving the transmission shaft (33) and the concave tank (35) to rotate by using the rotary oil cylinder (31); opening the unloading door (36) to discharge the mixed rubber out from the concave tank (35);

after the internal mixing is completed, introducing cooling water into the water inlet (13), wherein the cooling water enters the interlayer of the internal mixing chamber wall (12) from the water inlet (13) and flows out from the water outlet (15) to cool the internal mixing chamber (115); adding a detergent into the detergent nozzle (17) for cleaning the internal mixing chamber (115), wherein a waste liquid may be drained from the waste liquid port (14).

\* \* \* \* \*